April 26, 1966  J. D. HAYES ET AL  3,247,609
DISPLAY DEVICE

Filed Sept. 27, 1962  4 Sheets-Sheet 1

SLOBODAN GLIGORIJEVIC
JOHN D. HAYES
HAROLD H. SCHROEDER
*INVENTORS*

BY
ATTORNEYS

April 26, 1966  J. D. HAYES ET AL  3,247,609
DISPLAY DEVICE
Filed Sept. 27, 1962  4 Sheets-Sheet 2

SLOBODAN GLIGORIJEVIC
JOHN D. HAYES
HAROLD H. SCHROEDER
INVENTORS

ATTORNEYS

April 26, 1966 J. D. HAYES ET AL 3,247,609
DISPLAY DEVICE

Filed Sept. 27, 1962 4 Sheets-Sheet 3

SLOBODAN GLIGORIJEVIC
JOHN D. HAYES
HAROLD H. SCHROEDER
INVENTORS

BY *Arthur L. Nelson*
*Frank C. Parker*
ATTORNEYS

April 26, 1966  J. D. HAYES ET AL  3,247,609
DISPLAY DEVICE
Filed Sept. 27, 1962  4 Sheets-Sheet 4

SLOBODAN GLIGORIJEVIC
JOHN D. HAYES
HAROLD H. SCHROEDER
INVENTORS

BY
ATTORNEYS

United States Patent Office 3,247,609
Patented Apr. 26, 1966

3,247,609
DISPLAY DEVICE
John D. Hayes, Los Angeles County, Calif., and Harold H. Schroeder and Slobodan Gligorijevic, Rochester, N.Y., assignors to Bausch & Lomb Incorporated, Rochester, N.Y., a corporation of New York
Filed Sept. 27, 1962, Ser. No. 226,645
5 Claims. (Cl. 40—77)

This invention relates to interference films and more particularly to a display device using interference films.

Various means have been used in advertising signs and display devices whereby the intensity and the color of the light may be varied to catch the attention of a potential customer. Varying the intensity requires an electrical circuit which controls the intensity of the luminous flux impinging on a sign or other device. Having a changing color requires a number of lights or else a number of color filters to change the hue of the luminous flux which is visible through observation. These various devices require a relatively complex device in contrast to the use of the interference films which transmit a luminous flux causing a variation in the hue and saturation of color sensation or the brightness of the luminous flux. Accordingly this invention is intended to change the color sensation and the degree of brightness as observed from a viewing position.

It is an object of this invention to provide a display means which varies the apparent thickness of an interference film to thereby change the hue, saturation, and brightness of a luminous flux.

It is another object of this invention to change the length of light path through an interference film to thereby vary color and brightness sensation of a luminous flux transmitted in the film.

It is a further object of this invention to provide a supporting medium carrying a film and change the length of the path of light rays of a luminous flux transmitted in the film to thereby change the color sensation and degree of brightness subsequent to the passing of the luminous flux through the film.

The objects of this invention are accomplished by placing an interference film on a supporting medium and directing a luminous flux on the interference film to cause an interference effect on the luminous flux. The passing of the luminous flux through the film may cause a destructive or constructive effect on the luminous flux to control the brightness, the hue or saturation in the luminous flux. The film thickness may be variable from a thickness where the film is relatively small by comparison to the wavelength or have a thickness which is substantially a common multiple of a quarter wavelength of the light. It can be seen that where a white light is used the luminous flux passing through the film may appear to contain greater saturations of certain hues due to the destructive interference of certain wavelengths interfering with similar wavelengths as they are reflected and emerge from the film. Where the supporting medium is a light transmitting substrate the reflected light is a complement of the transmitted light being transmitted through the light transmitting medium, with a changing relative position of the film in relation to the source of illumination or luminous flux and the point of observation.

The invention herein might be modified and still fall within the scope of the invention; however, the preferred modifications and illustrations are illustrated in the following description taken with the drawings herein.

FIG. 9 is a graphic illustration of the wave-form inversion caused by a light wave being reflected by the surface of a heavier medium than the medium in which the wave is passing through.

Figure 3:
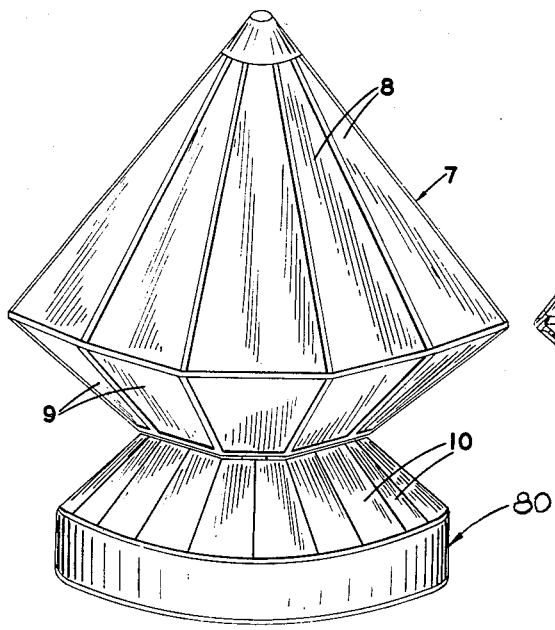
FIG. 3 is a modification of a display device using a transmission and reflecting medium for supporting of the interference film.
Figure 4:
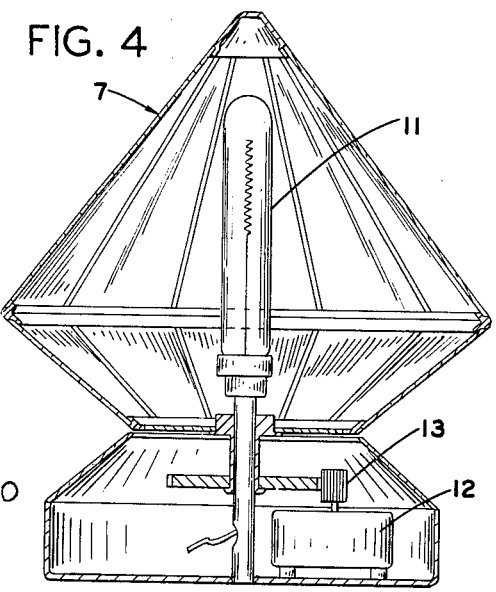
FIG. 4 is a mid-sectional view of the device shown in FIG. 3 illustrating a rotating mechanism, and a source of illumination.
Figure 5:
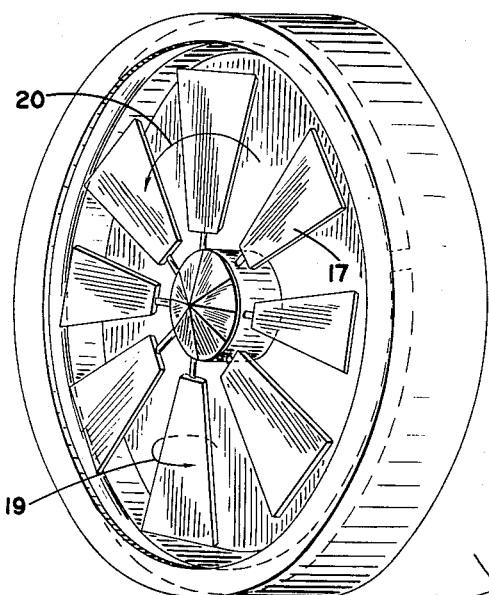
FIG. 5 is a further modification illustrating a plurality of light sources, with reflecting and transmitting mediums for supporting the interference films.
Figure 6:
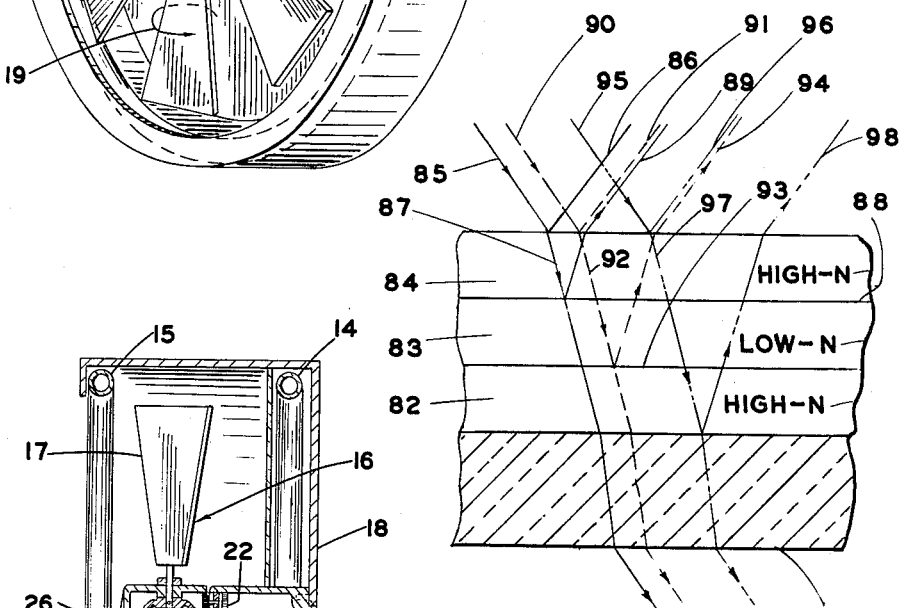
FIG. 6 is a mid-sectional view of FIG. 5 illustrating the relative location of parts in the device.

The figures as described above set forth various modifications of the display device. Each of the devices set forth a different principle in the manner in which the light impinges and is transmitted through an interference film. The luminous flux is directed on the interference film and may be reflected partially and partially transmitted and reflected to cause an interference of the light. FIGS. 3 and 4 illustrate the transmission principle as well as reflection principle which combine to give a variation in color and intensity of the luminous flux as observed from an external point. FIGS. 5 and 6 illustrate a reflection and transmitting device whereby the transmitted light is the complement of the reflected light.

Figure 7:
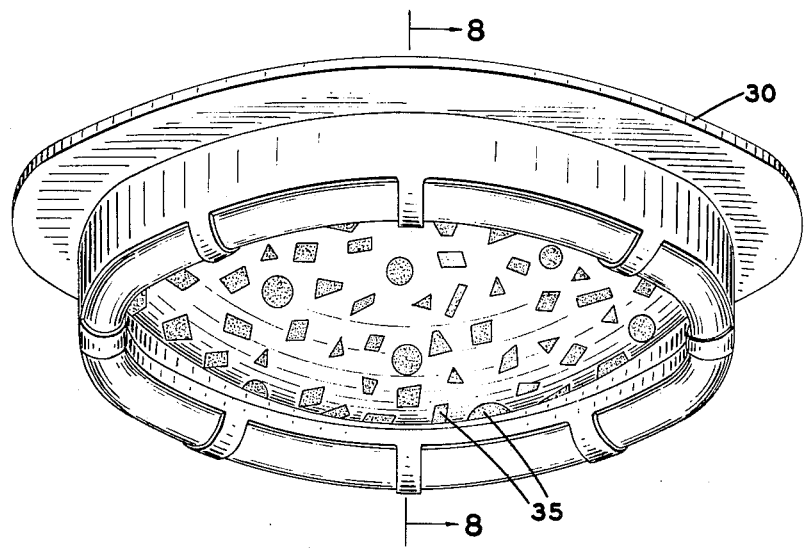
FIG. 7 is a lighting device illustrating the use of the interference films.
Figure 8:
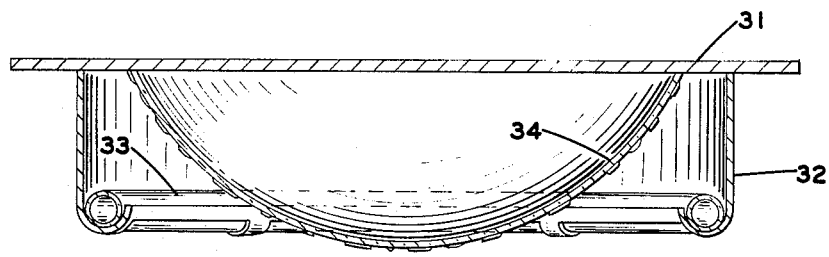
FIG. 8 is a mid-sectional view taken of FIG. 7.

FIGS. 7 and 8 illustrate a single source of light and a reflecting of the light from a reflector by interference films. The principle involved is changing the thickness of the film relative to the light passing through the film. This may be accomplished by moving the source of illumination relative to the film or moving the film relative to the source of illumination or moving the point of observation to thereby change the length of the light path through the film. The various modifications illustrate this principle through a means of transmission and reflection of the luminous flux to cause a varying color sensation as well as brightness sensation.

Figure 1:
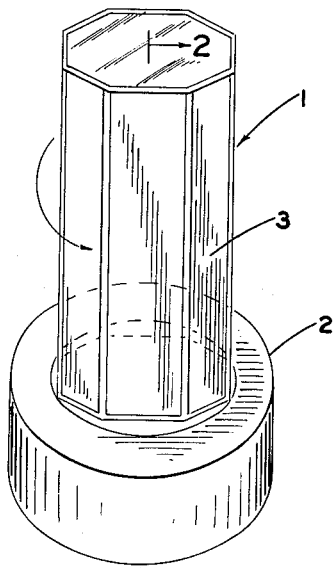
FIG. 1 illustrates a rotating column formed of a plurality of panels supporting films of predetermined thicknesses.

Referring to FIG. 1 the octagon column 1 is rotatably supported on the base 2. The column is formed of an octagon framework for supporting a plurality of panels 3. Each of the panels is formed of a light transmitting material such as glass or plastic having a smooth external surface. The internal surface might be smooth or frosted to cause a diffusion of light passing through the panel. The external surface as illustrated in FIG. 1 carries a film which causes interference of the light rays passing through the panel and the film. The constructive and destructive interference associated with this film will be described in later paragraphs.

Figure 2:
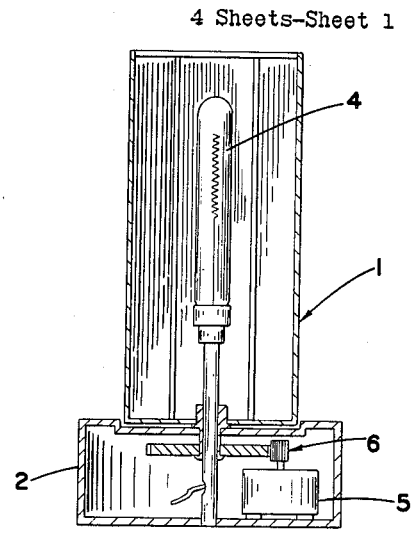
FIG. 2 is a cross section view taken on line 2—2 of FIG. 1 illustrating the source illumination within the column, and the rotating mechanism.

FIG. 2 illustrates a source of illumination centrally located on the base 2. A suitable mechanism including a motor 5 and gear arrangement 6 rotate the column 1 about the center of rotation. As the column 1 rotates the thickness of the path of light through each of the plurality of panels 3 is constantly being changed which causes an interference whereby certain wavelengths of light are annihilated and others reinforced. The reinforced wavelengths give a color sensation of this wavelength and accordingly the annihilated wavelengths cause an absence of this specific wavelength and a lack of color sensation specific to this wavelength.

FIGS. 3 and 4 illustrate a rotating multi-sided column 7 rotatably supported on the base 80. The column 7 includes a plurality of panels 8 carrying films of various thicknesses which transmit light from the light source internal of the column. A second array of panels 9 are positioned for transmission of light downwardly which in turn may be reflected by the mirror panels 10 on the base 80.

FIG. 4 illustrates the source of illumination 11 mounted internally of the column 7. A motor 12 and gear arrangement 13 rotate the column 7 relative to the base 80. The upper panels 8 operate in a similar manner to the panels 3 illustrated in FIGS. 1 and 2. An additional feature, however, is included here whereby light transmitted through the panels 9 may be reflected on the mirror surfaces 10 causing a different color sensation of panels due to the changing path length of light through the panels 9. Interference films are placed on the panels 8 and 9 causing the varying color sensation from viewing the device. The panels 10 may be constructed to carry an additional interference film or merely using a mirror surface to reflect light after passing through the panels 9. The type of construction will depend on the effect desired from the display device.

FIGS. 5 and 6 illustrate a modification whereby a plurality of lights 14 and 15 direct light on the paddle wheel 16. The lights 14 and 15 may be varied to include white light or any color or range of colors desired. If both of the lights are white the light passing through the plurality of paddles 17 will be the complement of lights reflected from the paddles. The use of a white light provides a wide range of colors sensation observed on the device.

The light sources 14 and 15 are supported within a housing 18 which operates as a reflector and directs the light radially inward on the paddle 17. The paddles rotate about their own axis as indicated by the arrow 19 and also rotate about a common axis as indicated by the arrow 20. This combined movement causes an alternate reflection and transmission of the light directed on each of the paddles 17 as viewed from an external point. The motion is generated by the motor 21 supported on the housing 18 which rotates shaft 24. The motor also drives through a gear mechanism 22 to rotate the hub 23 about a common center and relative to the shaft 24. The shaft 24 in turn causes rotation of a bevel gear 25 which meshes with the plurality of bevel gears 26 which individually rotates each of the paddles 17 about their own centers.

FIGS. 7 and 8 illustrate a display device adapted for use as a lighting fixture. The support 30 is formed of a plate 31 carrying a reflector 32 which retains the bulb 33, a generally spherical substrate 34 supports the plurality of elemental films 35. The substrate forms a reflector on the base of each of the films 35 which may be constructed in any suitable configuration giving any variety of color sensation. The films 35 may be deposited in elemental areas of different thicknesses of the substrate 34 to provide variation in color sensation. The elements 35 might be a continuous layer of varying thickness thereby creating a mottled effect instead of precise boundaries as illustrated.

This modification uses a principle of light being transmitted through the film and then reflected to the point of observation. Although not illustrated, this device might include means for rotating the substrate 34 which would cause a variation in color sensation and brightness as the film is rotated relative to the position of viewing. The form as presently illustrated provides a change in color and brightness as the point of observation is moved relative to the film.

FIGS. 9, 10, 11, 12 and 13 set forth the basic theory involved in the display device. The modifications as illustrated in the previous figures may include one or all of the principles illustrated in these diagrams.

Figure 9:
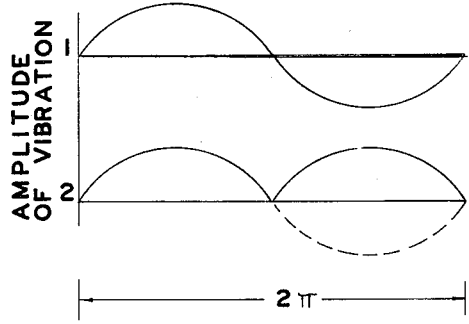
Figure 10:
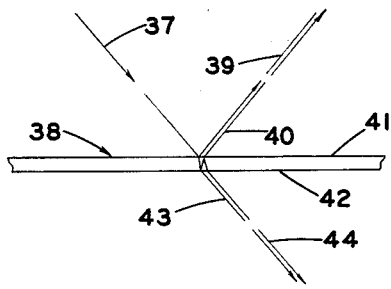
FIG. 10 is a diagrammatic illustration of a ray reflected and transmitted by an interference film having a thickness which is small in comparison in wavelength of light.

Referring to FIG. 10 a source of light radiates a luminous flux including incident ray 37 which impinges on the interference film 38 without a supporting substrate. A part of the light is reflected as indicated by the ray 39. A portion of the light is transmitted through the film 38 and is reflected by the film surface as indicated by the ray 40. FIG. 10 illustrates a film thickness which is small by comparison to the wavelength of light impinging on the film 38. The light reflected by the air film surface 41 is subject to a phase reversal as indicated by the waveform 2 of FIG. 9. This phenomena is created when a light wave transmitted in air is reflected by an air film surface when the film has a greater refractive index than the air. The phase reversal is equivalent to pi or in other words causing a 180° phase change of the light reflected from the air film surface indicated by ray 39. The film in this illustration is small by comparison to the wavelength of light and therefore light transmitted into the film and reflected by the interface 42 does not experience a phase reversal but is merely reflected as indicated by ray 40 and is substantially 180° out of phase with the ray reflected by the air film surface as previously described to cause destructive interference.

A portion of the light passing through the film is transmitted through the film as indicated by ray 43. The luminous flux is not wholly reflected or transmitted by the first passage through the film. The remaining portion of the light is reflected by the film air surface and may be redirected through the film as indicated by ray 44. The light transmitted through the film 38 does not experience a phase reversal and therefore creates a constructive interference or in other words a reinforcement of the particular wavelength involved and gives a brighter visual sensation on the opposite side of the film.

FIG. 9 illustrates the waveform of the light prior and subsequent to phase reversal. The waveform 1 indicates the ray prior to impinging on the film 38 and the waveform 2 indicates the 180° phase reversal by the ray 39 as it is reflected by the air film surface 41. The 180° phase reversal causes destructive interference. To achieve the desired degree of saturation multiple layers of alternating high and low index film are deposited on the substrate. If alternate layers are all an odd multiple of quarter wavelength, then the same wavelength is reinforced in reflected light from all layers and the complement thereof is destroyed in the transmitted light. The case of even multiples creates the opposite condition of interferences.

Figure 11:
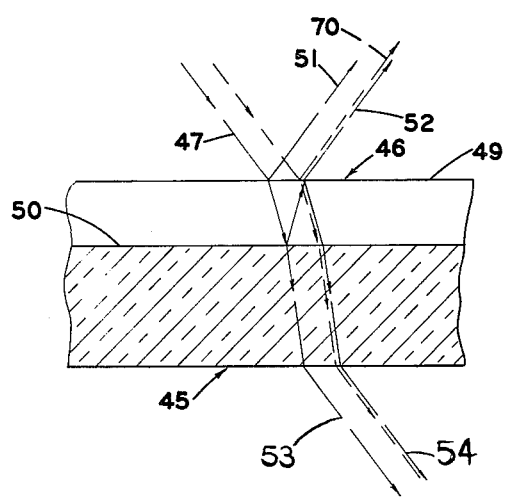
FIG. 11 is a diagrammatic illustration of light ray interference caused by an interference film of a thickness substantially equal to a multiple of a quarter wavelength of light and which film is supported on a light transmitting substrate.

The film thickness on the substrate may be varied to give the desired effect. The film thickness may be controlled through visual observation during the process of coating. The varying effect caused by coating this substrate with a varying thickness of film is illustrated in FIG. 11 whereby the substrate 45 is of a material such as glass and for this illustration has a greater refractive index than the film 46. This introduces a phase reversal as the ray 47 of the luminous flux as the ray is reflected at the air film surface 49 or the film glass interface 50. If the film 46 is a quarter wavelength of optical thickness then the ray 70 will be 180° out of phase with the ray 52 and thereby causing destructive interference and a substantial reduction in the reflection from the surface. If the film 46 however, were an even multiple of quarter wavelengths the reflection from the surface would be reinforced causing a constructive interference of the rays 51, 52.

The explanation of FIG. 11 and FIG. 10 has been specific to a single wavelength, in other words specific to monochromatic light. In the case of achromatic light or white light the light reflected is a complement of the light transmitted. With a changing film thickness a changing color sensation is realized depending on the constructive and destructive interference pattern. The destructive interference does not mean that the energy associated with the light has been annihilated. The transmitted rays in phase with one another passing through the substrate are reinforced without loss of energy.

As illustrated the rays entering at 47 are transmitted through the film 46 and reflected by the film glass through the film 46 and again reflected by the air film surface and redirected through the film 46 and the substrate 45. The ray 53 does not experience a phase reversal as it is transmitted directly through the film 46 and the substrate 45. The ray 54, however, does experience a phase reversal as it was reflected on the film glass interface. This causes a 180° phase reversal. If the film thickness 46 is an odd number of multiples of a quarter wavelength then rays 53 and 54 are in phase causing a reinforcement as the rays leave the substrate after being transmitted through the film and the substrate. If the film thickness is an even multiple of quarter wavelengths in optical thickness then there is a destructive interference of the transmitted light and also a reinforcement of the reflected light for the specific wavelength in question.

Figure 12:
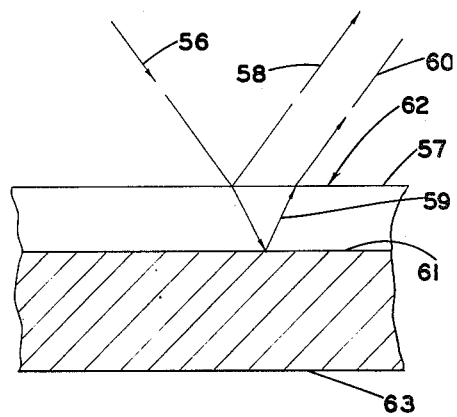
FIG. 12 is a similar illustration to FIG. 11 wherein the film is carried on a metallic reflecting medium.

FIG. 12 illustrates a variation of a thicker film relative to FIG. 10. The ray 56 reflected on the air film surface 57 as ray 58 experiences a phase reversal of 180°. The portion of the flux forming the ray 59 is reflected back through the film and leaves the film as ray 60. If the interface surface 61 between the film 62 and the substrate 63 is a metal then no phase reversal is experienced by ray 60. If the film thickness of film 62 is an odd multiple of the quarter wavelength of the light observed then there is constructive interference and reinforcement between rays 58 and 60. With a metallic substrate 63 there is no light transmitted through the substrate and all light is reflected back through the film 62 to cause constructive interference with other light. An odd multiple of quarter wavelength of film thickness will cause constructive interference and reinforcement of the energy reflected. From this discussion of the theory involved it is obvious that most any degree of brightness of a single wavelength of light may be achieved. The brightness will vary from complete destructive interference of the luminous flux or complete constructive interference of the reflected light to obtain greater brilliance. If the film thickness and number of layers of film is varied a variation in brightness may be achieved depending upon the thickness and layers of the film desired. A greater number of layers will enhance the saturation for a given film thickness at a specific wavelength.

Figure 13:
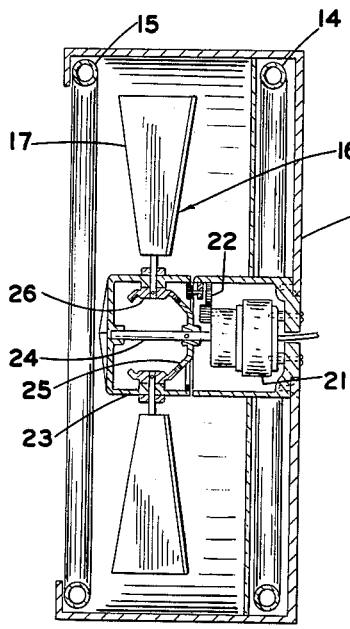
FIG. 13 is a diagrammatic illustration of light interference caused by a plurality of layers of films in a manner to increase the degree of saturation of the hue.

Referring to FIG. 13 three layers of film are deposited on a substrate 81. For the purpose of illustration the first layer has a high index of refraction (N), relative to the glass substrate 81. The next layer of film has a low index of refraction relative to the glass and the first layer. The third layer again has a high index of refraction relative to the glass 81. The film thicknesses may be varied to achieve the desired result, however, for the purpose of illustration consider the film thicknesses to be ¼ wavelength. The ray 85 of a luminous flux is reflected as the ray 86 and experiences a phase reversal of 180°. The ray 87 is reflected by the film interface 88 and emerges as ray 89 causing a constructive interference and reinforcement of the light converging at the air film surface.

The ray 90 of the luminous flux experiences a phase reversal as it is reflected forming ray 91. The ray 92 penetrates the film 84 and 83 and is reflected by the interface 93 and emerges as the ray 94. The reflection by the interface 93 of a film of low refractive index and high refractive index causes a phase reversal and again the light emerging from the air film surface reinforces the reflected light.

The ray 95 likewise experiences a phase reversal as it is reflected by the air film surface to form ray 96. The ray 97 penetrating the three films and being reflected by the glass film interface does not experience a phase reversal and therefore emerges from the air film surface as ray 98 reinforcing any reflected light from the air film surface. It is readily seen that all light reflected causes a constructive interference pattern and thereby enhances the saturation of a certain hue. Theoretically the saturation could be greatly increased, however, certain practical limitations are reached when the number of films becomes too great. As pointed out previously in describing the preceding figures the transmitted light is the complement of the reflected light. This is also true in the case illustrated in FIG. 13, the theory involved is the same as described in the preceding paragraphs and considering internal reflection as the light is reflected by the interfaces.

If the source of illumination is achromatic then the destructive and constructive interference merely emphasizes a certain hue or saturation of a certain hue and therefore changes the color sensation as regards to a person viewing the display device. In combination with the variation of the hue and saturation the variation in brightness may also be changed. Various signs and display devices have been used in the past, however, the simplicity coupled with the results achieved through use of this principle are varied.

The modifications illustrated in FIGS. 1–8 involve variations of the principles set forth in FIGS. 9–13. FIGS. 1 and 2 illustrate a device intended to operate with a stationary point of observation and a stationary source of illumination. The interference film itself is moved relative to a fixed point causing a changing color sensation of various film thicknesses due to the apparent changing of film thickness or in other words the actual distance the light ray passes through the film.

FIGS. 3 and 4 uses this same principle, however, directing the light at various angles through the film causes a changing color sensation. The light is reflected then by the mirrors on the base to cause an additional change in brightness as well as color. The film in this case is also moved relative to the point of observation and the light source as is set forth in FIGS. 1 and 2.

FIGS. 5 and 6 illustrate a plurality of light sources which may be white light or any colors desired. The paddles on the wheel may be either of a reflecting substrate or a transmitting substrate. In event that the paddles are a transmitting substrate the light passing from the source of illumination through the paddle wheel is a complement of the reflected light from the paddle. The combined motion of the rotation of the wheel itself as well as each paddle about its own center provides a rapidly changing color and brightness and therefore a very attractive device.

FIGS. 7 and 8 illustrate a means for adapting this device to a lighting fixture whereby the substrate is any reflecting or transmitting medium. The interference film may be individually deposited as separate geometrical figures or mottled to give whatever effect may be desired. The reflection from the substrate through the film causes a change of color. This device as illustrated has a stationary source of light and substrate as well as film and the field of view is sufficiently large to permit movement of the point of observation relative to the film and the source of illumination.

The preferred modifications and illustrations are set forth in this application although others might be devised which would fall within the scope of the invention. The following claims define the scope of this invention.

We claim:
1. A display device comprising, supporting means, a source of light mounted on said supporting means radiating a luminous flux containing more than one wavelength of light, a plurality of panels forming a transparent substrate each defining a planar surface for rotation relative to the luminous flux, at least one interference film supported on each of said substrate producing constructive and destructive interference with the light rays in the luminous flux, motor means mounted on said supporting means rotating each of said panels relative to the luminous flux for constantly varying the angle of the planar surfaces defined by said substrates relative to the light rays in the luminous flux and thereby varying the light path length through said films to produce a variable brightness and color sensation depending on the angle of the light rays incident upon said substrate.

2. A display device comprising a supporting means, a light source mounted on said supporting means radiating a luminous flux, a housing means rotatably mounted on said supporting means, a plurality of transparent panels supported by said housing means defining a substrate having a surface, at least one interference film supported on said substrate, motor means mounted on said supporting means rotating said housing and said panels relative to the luminous flux from said light source causing the angle of incidence and reflection of the luminous flux relative to the panels to constantly vary and thereby produce a variable brightness and color sensation in response to the length of light path through each of said films supported by said substrate.

3. A display device comprising supporting means, a housing means rotatably supported on said supporting means, a light source on said supporting means radiating a luminous flux, a plurality of transparent panels mounted on said housing means each defining a substrate, a plurality of opaque reflecting panels each defining a substrate mounted on said supporting means, at least one interference film supported on each of said substrates defined by said panels, motor means on said supporting means for rotating said housing means to constantly vary the angle between the transparent panels and the light rays forming said luminous flux and thereby produce a constantly varying light path length through said films on said panels and produce a variable brightness and color sensation depending on the angle of incidence on said light rays of luminous flux with the substrate carrying said films.

4. A display device comprising supporting means, at least one light source mounted on said supporting means radiating a luminous flux containing more than one wavelength of light, a plurality of panels each defining a substrate having a surface rotatably mounted about their individual axes relative to said housing, a plurality of films having alternate high and low index of refraction deposited on the substrate defined by each of said panels, motor means mounted on said supporting means and drivingly connected to each of said panels for rotating each of said panels about their individual axes to constantly vary the angle between the light rays in the luminous flux and the surface defined by each of said panels to thereby vary the light path length through said films to produce a variable brightness and color sensation in a field of observation.

5. A multi-colored display device comprising, a housing, a first light source mounted on said housing radiating a luminous flux containing at least one wavelength of light, a second light source mounted in spaced relation to said first light source on said housing and radiating a luminous flux containing more than one wavelength of light, a wheel rotatably mounted on said housing, a plurality of spokes each defining a planar surface rotatably mounted on said wheel for rotation about their individual axes, at least one light transmitting interference film mounted on each of said spokes, motor means rotating said wheel and said spokes to thereby produce a changing angle between the surface on said spokes and the luminous fluxes the alternate transmission and reflection of light rays in the luminous fluxes causing an interference pattern varying the color sensation of light as viewed from a viewing field.

References Cited by the Examiner
UNITED STATES PATENTS

| | | | |
|---|---|---|---|
| 2,201,093 | 5/1940 | Illo | 240—10.1 |
| 2,376,428 | 5/1945 | Hansell. | |
| 2,589,930 | 3/1952 | Dimmick et al. | |
| 2,761,797 | 9/1956 | Young | 88—106 X |
| 2,913,572 | 11/1959 | Fritzlen | 240—10.1 |
| 3,082,661 | 3/1963 | Irland et al. | 88—106 X |
| 3,085,468 | 4/1963 | Hehn | 88—106 X |

FOREIGN PATENTS 147,246  10/1936  Austria.

EUGENE R. CAPOZIO, *Primary Examiner.*

N. ANSHER, JEROME SCHNALL, *Examiners.*

WILLIAM GRIEB, *Assistant Examiner.*